(12) United States Patent
Lee et al.

(10) Patent No.: US 12,034,949 B2
(45) Date of Patent: Jul. 9, 2024

(54) VIDEO DECODING APPARATUS AND VIDEO DECODING METHOD

(71) Applicant: Samsung Electronics Co., Ltd., Suwon-si (KR)

(72) Inventors: Seokhyun Lee, Seoul (KR); Taesung Kim, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 0 days.

(21) Appl. No.: 17/575,414

(22) Filed: Jan. 13, 2022

(65) Prior Publication Data
US 2022/0224927 A1 Jul. 14, 2022

(30) Foreign Application Priority Data

Jan. 14, 2021 (KR) .................. 10-2021-0005393
Apr. 20, 2021 (KR) .................. 10-2021-0051400

(51) Int. Cl.
| H04N 19/159 | (2014.01) |
| H04N 19/137 | (2014.01) |
| H04N 19/186 | (2014.01) |
| H04N 19/423 | (2014.01) |
| H04N 19/593 | (2014.01) |
| H04N 19/91 | (2014.01) |

(52) U.S. Cl.
CPC ......... *H04N 19/423* (2014.11); *H04N 19/137* (2014.11); *H04N 19/159* (2014.11); *H04N 19/186* (2014.11); *H04N 19/593* (2014.11); *H04N 19/91* (2014.11)

(58) Field of Classification Search
CPC .. H04N 19/423; H04N 19/137; H04N 19/159; H04N 19/186; H04N 19/593; H04N 19/91

USPC ..................................................... 375/240.16
See application file for complete search history.

(56) References Cited

U.S. PATENT DOCUMENTS

| 6,985,528 B2 | 1/2006 | Shin et al. |
| 8,495,303 B2 * | 7/2013 | Lee .................. G06F 9/3824 |
| | | 711/131 |
| 9,329,871 B2 | 5/2016 | MacInnis et al. |

(Continued)

FOREIGN PATENT DOCUMENTS

JP 4755624 B2 8/2011

OTHER PUBLICATIONS

C. Huang et al., "A 249Mpixel/s HEVC Video-Decoder Chip for Quad Full HD Applications," ISSCC, pp. 162-163, 2013.

(Continued)

*Primary Examiner* — Albert Kir
(74) *Attorney, Agent, or Firm* — Muir Patent Law, PLLC

(57) ABSTRACT

A video decoding apparatus includes a first buffer storing input data received from an entropy decoder, a first motion compensation processor extracting motion compensation reference data based on the input data, and store the motion compensation reference data in a pixel cache, a second buffer, and a controller. The input data comprises one of first data including motion information and second data including intra prediction information. The controller controls the second buffer to store the motion compensation reference data stored in the pixel cache when the input data is the first data, and controls the second buffer to store the second data stored in the first buffer when the input data is the second data.

16 Claims, 11 Drawing Sheets

(56) References Cited

U.S. PATENT DOCUMENTS

| | | | |
|---|---|---|---|
| 9,449,367 B2* | 9/2016 | Jia | G06T 3/4053 |
| 10,038,908 B2 | 7/2018 | Yu et al. | |
| 10,057,567 B2 | 8/2018 | Hung et al. | |
| 10,057,595 B2 | 8/2018 | Kadono et al. | |
| 10,659,794 B2 | 5/2020 | Chen et al. | |
| 10,841,607 B2 | 11/2020 | Park et al. | |
| 10,917,637 B2* | 2/2021 | Yoo | H04N 19/70 |
| 11,087,721 B2* | 8/2021 | Kim | G09G 5/003 |
| 11,252,418 B2* | 2/2022 | Rapaka | H04N 19/159 |
| 11,463,716 B2* | 10/2022 | Matsuba | H04N 19/157 |
| 11,516,477 B2* | 11/2022 | Garg | H04N 19/146 |
| 2006/0056514 A1* | 3/2006 | Simpson | H04N 19/433 |
| | | | 375/E7.102 |
| 2008/0259089 A1 | 10/2008 | Matsubara | |
| 2016/0191935 A1* | 6/2016 | Chao | G06F 12/0811 |
| | | | 375/240.25 |
| 2018/0020228 A1* | 1/2018 | Wu | H04N 19/91 |
| 2020/0296392 A1* | 9/2020 | Choi | H04N 19/15 |

OTHER PUBLICATIONS

C. Ju et al., "A 0.2nJ/pixel 4K 60fps Main-10 HEVC Decoder with Multi-Format Capabilities for UHD-TV Applications," ESSCIRC, pp. 195-198, 2014.

Chen, Yue et al., An Overview of Core Coding Tools in the AV1 Video Codec. Conference: 2018 Picture Coding Symposium (PCS), Jun. 2018.

D. Zhou et al., "A 4Gpixel/s 8/10b H.265/HEVC Video Decoder Chip for 8K Ultra HD Applications," ISSCC, pp. 266-268, 2016.

* cited by examiner

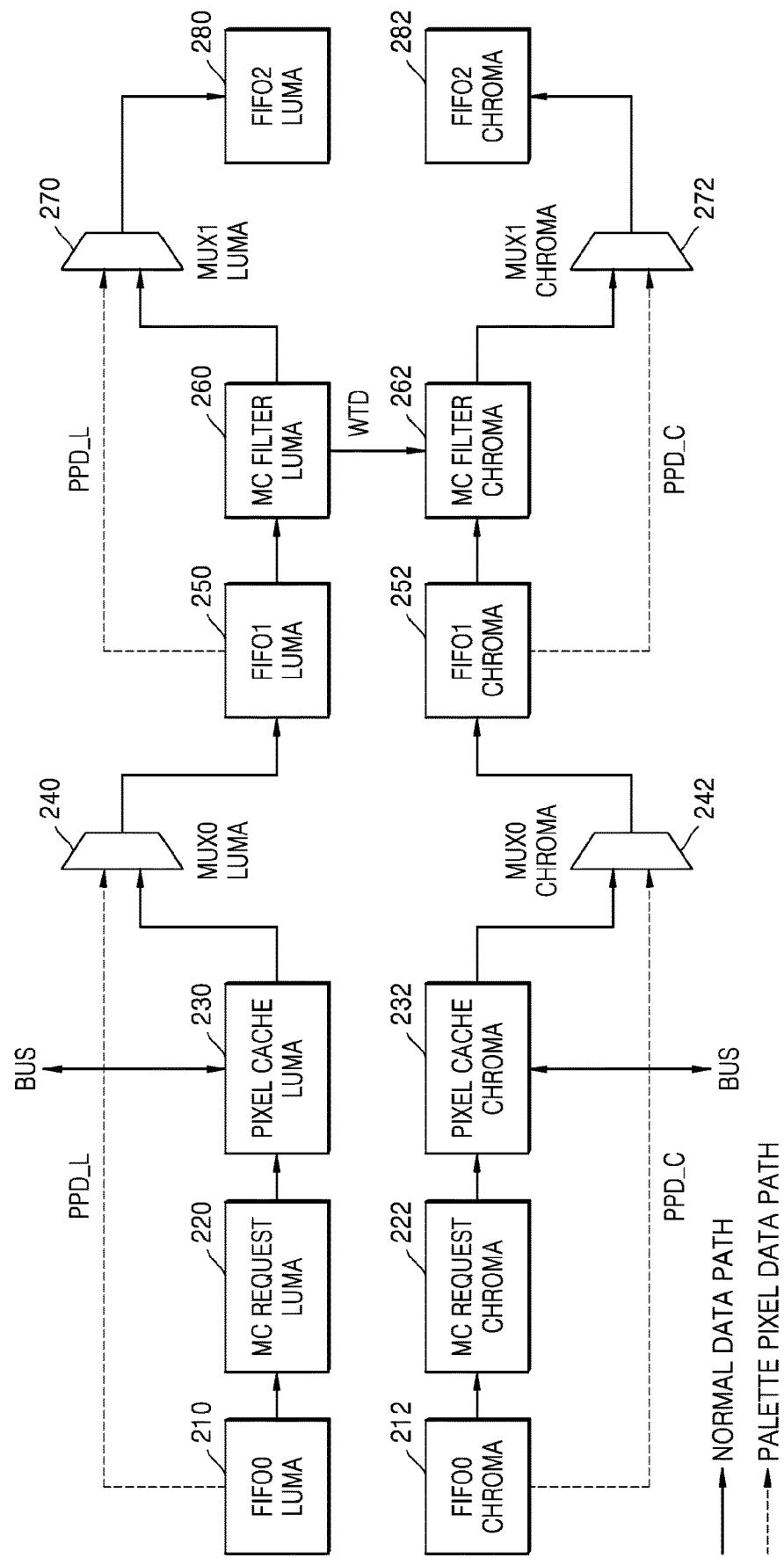

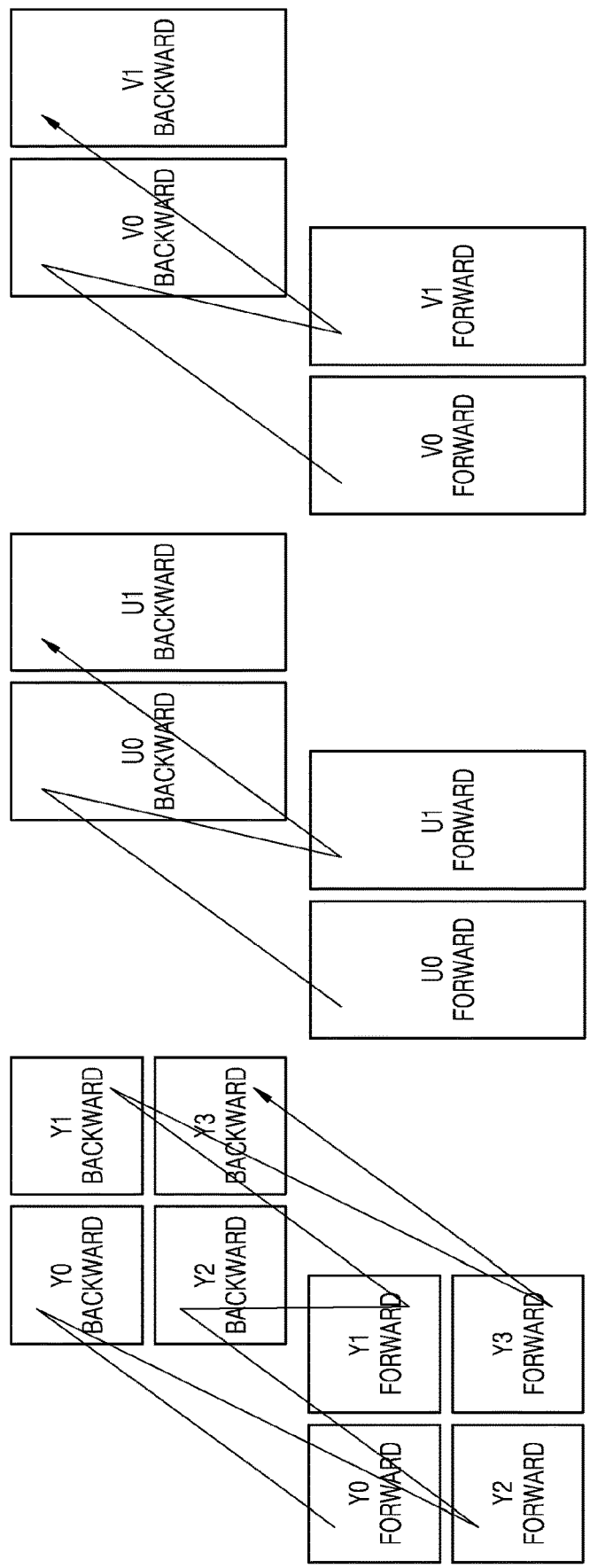

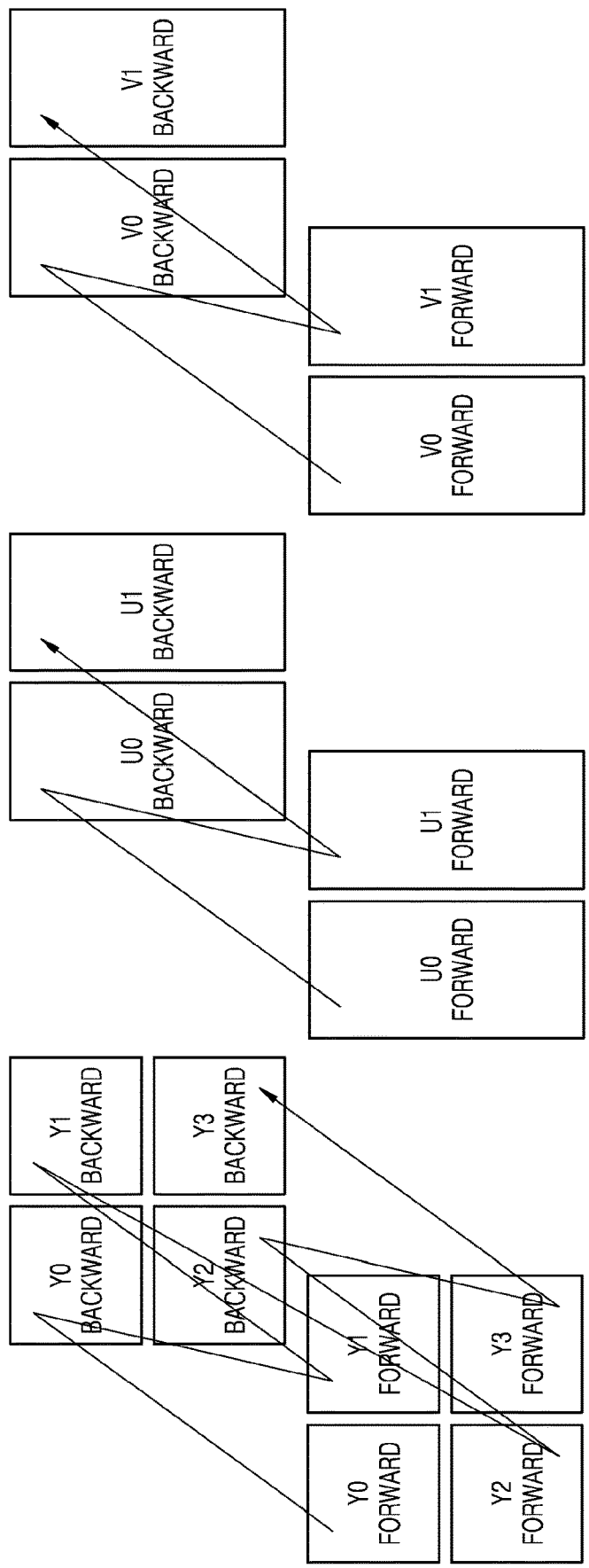

VIDEO DECODING APPARATUS AND VIDEO DECODING METHOD

CROSS-REFERENCE TO RELATED APPLICATIONS

This application is based on and claims priority under 35 U.S.C. § 119 to Korean Patent Applications Nos. 10-2021-0005393 and 10-2021-0051400, respectively filed on Jan. 14, 2021 and Apr. 20, 2021, in the Korean Intellectual Property Office, the disclosures of which are incorporated herein in their entirety by reference.

BACKGROUND

The inventive concept relates to a video decoding technique, and more particularly, to a video decoding apparatus and a video decoding method by which a memory is controlled to process decoding data including motion compensation data and palette prediction data.

With the development and dissemination of a hardware capable of reproducing and storing high-resolution or high-definition video content, a video codec for effectively encoding or decoding the high-resolution or high-definition video content has been developed. To effectively encode and decode high-resolution/high-definition images, various codings, such as moving picture experts group (MPEG)-2, H.264 advanced video coding (AVC), MPEG-4, high-efficiency video coding (HEVC), VC-1, VP8, VP9, and AOMedia Video 1 (AV1), are being used.

A video encoding process may refer to a process of generating encoded data (i.e., compressed data) having a smaller capacity than original data from the original data (i.e., image data or video data including a series of pieces of image data). In a process of generating decoding data by decoding the encoded data or a bit stream, it may be necessary to effectively control a memory device to temporarily store data to process various types of pieces of decoding data.

SUMMARY

The inventive concept provides a video decoding apparatus and a video decoding method, which may provide an effective memory utilization method during a process of processing decoding data and provide a synchronization method for minimizing an idle time during a process of processing a luminance signal and a chrominance signal.

According to an aspect of the inventive concept, there is provided a video decoding apparatus including an entropy decoder receiving a bit stream and generating input data comprising one of first data including motion information and second data including intra prediction information, a first buffer connected to the entropy decoder and storing input data received from the entropy decoder, a first motion compensation processor connected to the first buffer and extracting motion compensation reference data based on the input data, a pixel cache connected to the first motion compensation processor and configured to store the motion compensation reference data received from a memory through a data bus, a second buffer, a first multiplexer having inputs connected to the first buffer and the pixel cache and an output connected to the second buffer, and a controller controlling the first multiplexer such that the second buffer stores the motion compensation reference data stored in the pixel cache when the input data is the first data, and the second buffer to store the second data stored in the first buffer when the input data is the second data.

According to an aspect of the inventive concept, there is provided a video decoding method including receiving, by an entropy decoder, input data including one of first data including motion information and second data including intra prediction information and storing the received input data in a first buffer, extracting motion compensation reference data based on the input data, and in response to the input data being the first data storing the motion compensation reference data in a pixel cache, and then, storing the motion compensation reference data stored in the pixel cache in a second buffer, and in response to the input data being the second data, storing the second data stored in the first buffer in the second buffer.

According to another aspect of the inventive concept, there is provided a video decoding method that is performed by a motion compensation processing device. The video decoding method includes receiving forward luminance data and backward luminance data and generating weight data for performing a weight sum operation on the forward luminance data and the backward luminance data, and receiving forward chrominance data and backward chrominance data and performing a weight sum operation on the forward chrominance data and the backward chrominance data, based on the generated weight data. The generation of the weight data includes sequentially generating weight data about a first region, a second region, a third region, and a fourth region. The performing of the weight sum operation includes performing a weight sum operation on a first chrominance region including the first region and the second region when weight data about the first region and the second region is generated, and performing a weight sum operation on a second chrominance region including the third region and the fourth region when weight data about the third region and the fourth region is generated.

BRIEF DESCRIPTION OF THE DRAWINGS

Embodiments of the inventive concept will be more clearly understood from the following detailed description taken in conjunction with the accompanying drawings in which:

FIG. 5 is a diagram of a process of processing a luminance signal and a chrominance signal in a video decoding apparatus according to an example embodiment;

FIGS. 7A and 7B are diagrams illustrating sequences in which luminance signal data and chrominance signal data are processed, according to example embodiments;

DETAILED DESCRIPTION OF THE EMBODIMENTS

Figure 1:
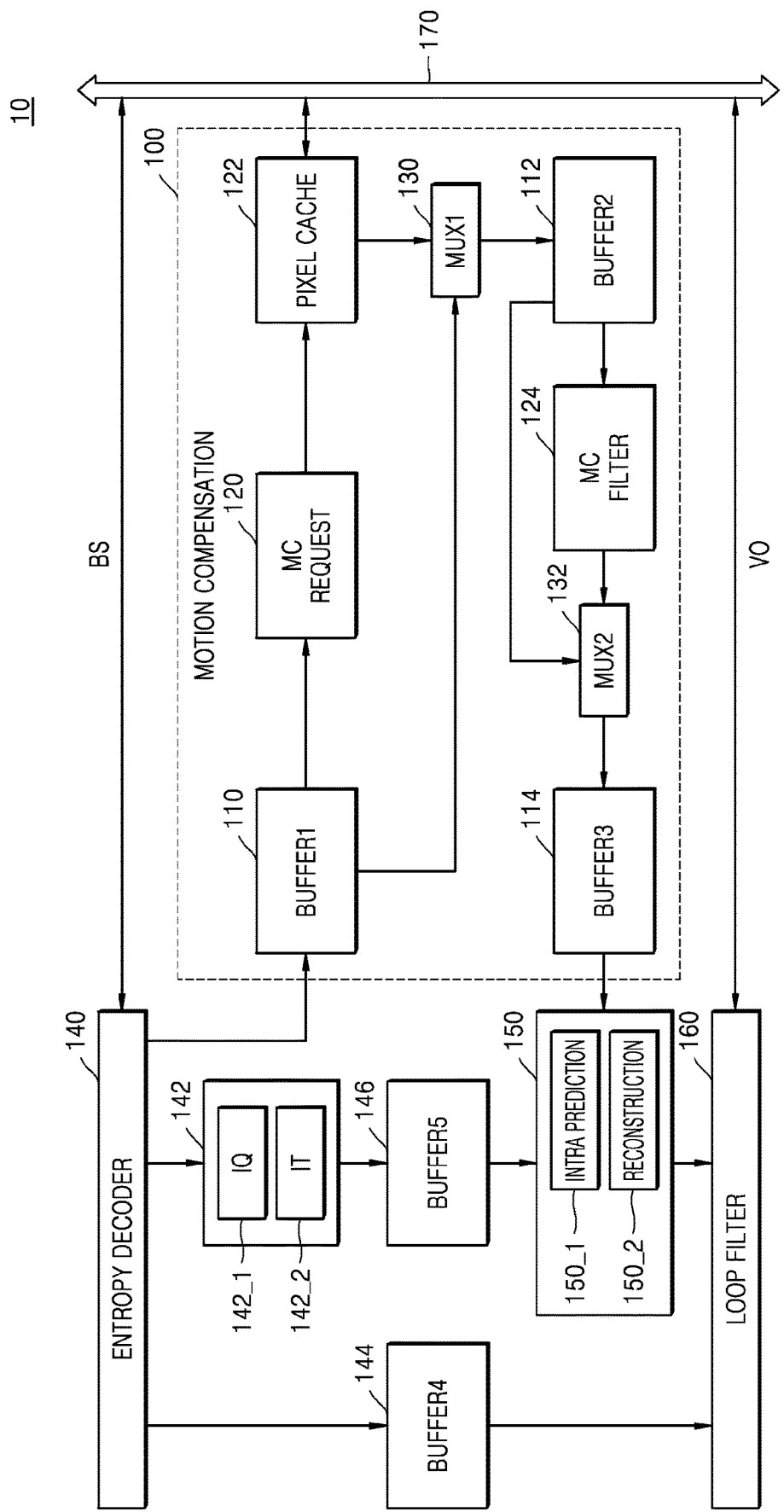
FIG. 1 is a block diagram of a video decoding apparatus according to an example embodiment.

Blocks shown in the drawings of the present specification may be modules, which perform specific functions on inputs to produce outputs, or may be implemented in specialized or general-use hardware and/or software configured to form (i.e., emulate) the modules. For example, a block may be a hardware module designed by logic synthesis or a software module including a series of instructions executed by a processor.

FIG. 1 is a block diagram of a video decoding apparatus 10, according to an example embodiment.

The video decoding apparatus 10 may be one of various apparatuses configured to process video data. For example, the video decoding apparatus 10 may be a device (e.g., a mobile phone, a desktop personal computer (PC), a laptop PC, and a tablet PC) including a display configured to output video data, a device (e.g., a digital camera, a digital camcorder, and a smartphone) including a camera module configured to generate video data, or a server configured to perform a video decoding operation to transmit data through a communication channel, such as a network. In addition, the video decoding apparatus 10 may include at least one semiconductor chip as a component included in the above-described devices. In some embodiments, the video decoding apparatus 10 may include a storage medium that is readable by a computer in which software including instructions executed by a central processing unit (CPU) or a graphics processing unit (GPU) is stored to perform a video decoding operation. The video decoding apparatus 10 may be referred to as a video decoder, but it will be understood that the video decoding apparatus 10 may include a device including the video decoder.

FIG. 1 illustrates only some of modules included in the video decoding apparatus 10. The video decoding apparatus 10 may include a first buffer 110, a motion compensation (MC) request unit 120, a pixel cache 122, a first selection circuit 130, a second buffer 112, an MC filter 124, a second selection circuit 132, a third buffer 114, an entropy decoder 140, an inverse quantization & inverse transform module 142, a fourth buffer 144, a fifth buffer 146, an intra prediction & reconstruction module 150 (i.e., an intra prediction and reconstruction module), a loop filter 160, and a data bus 170. The video decoding apparatus 10 may further include calculation blocks configured to perform addition or subtraction of data. An MC unit 100 may include the first buffer 110, the MC request unit 120, the pixel cache 122, the first selection circuit 130, the second buffer 112, the MC filter 124, the second selection circuit 132, and the third buffer 114, which are related to an MC operation.

The entropy decoder 140 may be a hardware accelerator configured to read an AOMedia Video 1 (AV1) bit stream from a memory coupled to the data bus 170 and decode the AV1 bit stream. Information decoded by the entropy decoder 140 may be transmitted to the loop filter 160, the inverse quantization & inverse transform module 142, the intra prediction & reconstruction module 150, and the MC unit 100. In some embodiment, a source image data may be encoded (i.e., compressed) using an entropy encoder, and such compressed image data may be transmitted to the entropy decoder 140, which may decode the compressed image data to reconstruct the source image data.

The inverse quantization & inverse transform module 142 may be an inverse quantization & inverse transform hardware accelerator of the AV1 standard. The inverse quantization & inverse transform module 142 may include an inverse quantization module 142_1 and an inverse transform module 142_2, and perform inverse operations to reverse the effect of operation performed by a quantization module (not shown) and a transform module (not shown) included in the entropy encoder.

The transform module of the entropy encoder may transform residual data, which is a difference between original data and prediction data, and generate input data. For example, the transform module may perform a discrete cosine transform (DCT) operation on the residual data and generate input data, and thus, input data of a spatial domain may be transformed into input data of a frequency domain.

The quantization module (or a quantizer) of the entropy encoder may quantize the input data and generate output data. For example, the quantization module may quantize the input data according to a quantization parameter. As described below, the quantization module may generate an adjusted quantization parameter to improve actual video quality of data that is decoded from encoded data (i.e., a bit stream) generated from the output data, quantize the input data according to the quantization parameter, and generate the output data. The quantization module may include a quantization parameter generator and a quantization processor. The quantization parameter generator may generate the quantization parameter for improving the actual video quality of the decoded data from the bit stream. The quantization processor may quantize input data according to the quantization parameter and generate output data. For example, the quantization processor may quantize the input data using a quantization matrix. A level of quantization may be adjusted by determining the quantization matrix according to the quantization parameter.

The inverse quantization & inverse transform module 142 (i.e., an inverse quantization and inverse transform module) may perform inverse operations of the quantization module and the transform module. For example, the inverse quantization module 142_1 may inverse quantize output data, and the inverse transform module 142_2 may generate data in a spatial domain by inverse transforming data (i.e., data in a frequency domain) generated by the inverse quantization module 142_1. The data generated by the inverse transform module 142_2 may be reconstructed residual data.

The loop filter 160 may be a loop filter hardware accelerator of the AV1 standard.

The intra prediction & reconstruction module 150 may be an intra prediction & reconstruction hardware accelerator of the AV1 standard and include an intra prediction module 150_1 and a reconstruction module 150_2.

The intra prediction module 150_1 may generate intra prediction data based on the original data reconstructed by the inverse quantization & inverse transform module 142 and data obtained by adding the prediction data and the residual data that is reconstructed by the inverse quantization module 142_1 and the inverse transform module 142_2. For example, the intra prediction module 150_1 may perform an intra-frame estimation operation and an intra-frame prediction operation and generate the intra prediction data.

An inter prediction module may generate inter prediction data based on frame data provided by a decoded frame buffer and original data. For example, the inter prediction module may perform a motion estimation (ME) operation and an MC operation and generate the inter prediction data. As used herein, the inter prediction module may be the MC unit 100.

An ME technique is being widely applied to video compression protocols, such as moving picture experts group (MPEG) and H.26x. The ME technique may include obtaining a motion vector (or MV) indicating a change in position between a current image and a previous image due to the motion of an object in a moving image or the movement of a camera and zoom in and out of video.

To obtain the motion vector, it may be determined whether to perform an ME operation in units of pixels or in units of blocks. For example, a block-unit ME operation may be mainly used during a process of compressing a moving image. A block matching algorithm may be a technique of estimating motion vectors of a current frame and a previous frame in units of blocks. A block used herein may be defined as a macroblock. The block matching algorithm may include comparing a block of the current frame with a block of the previous frame in a predetermined search area of the previous frame and detecting blocks with most similar data. A prediction block corresponding to the block of the current frame may be identified due to the ME operation described above.

In addition, the MC unit 100 may perform an MC operation for generating data (e.g., the prediction data) of the prediction block based on the motion vector. The ME operation and the MC operation, which are described above, may be performed with a precision of a fractional pixel or a sub-pixel unit (or referred to as a sub-pixel) to minimize prediction errors. For example, in the ME operation on the sub-pixel, an ME unit may generate a motion vector for identifying a prediction block at a position other than an integral pixel position.

The first buffer 110, the second buffer 112, the third buffer 114, the fourth buffer 144, and the fifth buffer 146 may be memories, which temporarily retain data during the transmission of the data from one spot to another spot, and input and output data according to the first-in-first-out (FIFO) rule. Each of the first selection circuit 130 and the second selection circuit 132 may be a multiplexer (or MUX) and may be a device configured to select one of several analog or digital input signals and transmit a selected input signal to one line (i.e., a component connected to the output of the multiplexer).

The first buffer 110 may be a memory device configured to temporarily store palette prediction pixel data or MC information (i.e., MC data) of the AV1 standard, which are generated by the entropy decoder 140. The second buffer 112 may be a memory device configured to temporarily store the palette prediction pixel data or MC reference data to be input to the MC filter 124. The third buffer 114 may be a memory device configured to temporarily store output data of the second selection circuit 132. The fourth buffer 144 may be a memory device configured to temporarily store data, which are generated by the entropy decoder 140 and will be transmitted to the loop filter 160, until an MC operation, an intra prediction operation, and a reconstruction operation are all ended. The fourth buffer 144 may store all the data, which are generated by the entropy decoder 140 and will be transmitted to the loop filter 160, during a time taken to completely end the MC operation, the intra prediction operation, and the reconstruction operation.

The fifth buffer 146 may be a memory device configured to temporarily store the residual signal data, which are inverse quantized and inverse transformed by the inverse quantization & inverse transform module 142, until the MC operation is ended. The fifth buffer 146 may store all the residual signal data generated by the inverse quantization & inverse transform module 142 during a time taken to completely end the MC operation.

The pixel cache 122 may be a memory device configured to temporarily store the MC reference data read from a memory through a data bus. The reference data is required to perform an MC operation of the AV1 standard. In some embodiment, the pixel cache 122 may store the MC reference data from a memory.

The MC request unit 120 (i.e., a first motion compensation processor) may be a device configured to request the MC reference data from a memory through a data bus, required for the MC operation of the AV1 standard and store the MC reference data to the pixel cache 122.

The first selection circuit 130 may select one of the palette prediction pixel data stored in the first buffer 110 and the MC reference data stored in the pixel cache 122.

The MC filter 124 (i.e., a second motion compensation processor) may be a hardware accelerator configured to perform an MC filtering operation specified in an AV1 standard.

The second selection circuit 132 may select one of the palette prediction pixel data stored in the second buffer 112 and an output value of the MC filter 124 that has performed the MC operation specified in the AV1 standard.

The data bus 170 may use an advanced microcontroller bus architecture (AMBA) bus protocol or an Advanced eXtensible Interface (AXI).

Figure 2A:
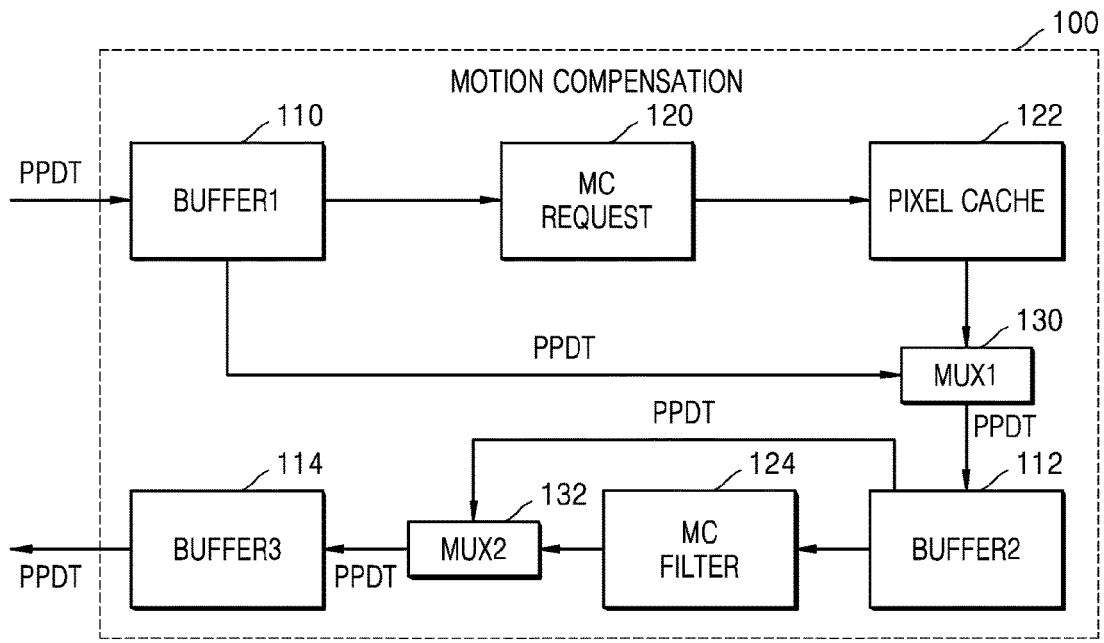
FIGS. 2A and 2B are block diagrams of a video decoding apparatus, according to an example embodiment.
Figure 2B:
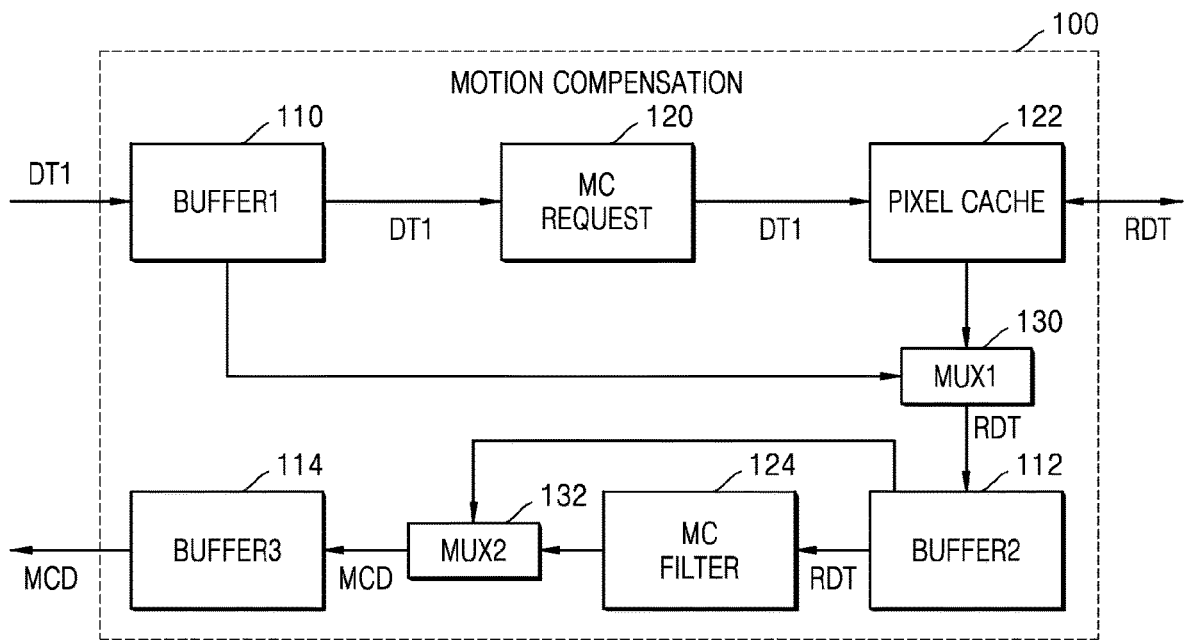

FIGS. 2A and 2B are block diagrams of a video decoding apparatus, according to an example embodiment.

An MC unit 100 may include a first buffer 110, an MC request unit 120, a pixel cache 122, a first selection circuit 130, a second buffer 112, an MC filter 124, a second selection circuit 132, and a third buffer 114, which are related to an MC operation.

The video decoding apparatus may include the MC unit 100 capable of processing both MC data DT1 and palette prediction pixel data PPDT instead of using an additional memory device configured to temporarily store the palette prediction pixel data PPDT. For example, FIG. 2A illustrates a data processing path when the palette prediction pixel data PPDT are received by an MC unit 100. When the palette prediction pixel data PPDT is received by an entropy decoder, the MC unit 100 may store the received palette prediction pixel data PPDT in the first buffer 110. The MC unit 100 may select the palette prediction pixel data PPDT stored in the first buffer 110 by using the first selection circuit 130 and store the palette prediction pixel data PPDT in the second buffer 112. The MC unit 100 may select the palette prediction pixel data PPDT stored in the second buffer 112 by using the second selection circuit 132 and store the palette prediction pixel data PPDT in the third buffer 114. The MC unit 100 may transmit the palette prediction pixel data PPDT stored in the third buffer 114 to an intra prediction module or another module.

For example, although the first buffer 110, the second buffer 112, and the third buffer 114, which are included in the MC unit 100, may be memories configured to process data related to the MC operation, the first selection circuit 130 and the second selection circuit 132 may be added to the MC unit 100 and also used as components configured to temporarily store the palette prediction pixel data PPDT to transmit the palette prediction pixel data PPDT to the next operation.

FIG. 2B illustrates a data processing path when MC data DT1 are received by the MC unit 100. When the MC data DT1 is received by an entropy decoder, the MC unit 100 may store the received MC data DT1 in the first buffer 110. The MC request unit 120 may request MC reference data RDT required to perform an MC operation of the AV1 standard, based on the MC data DT1 stored in the first buffer 110, from a memory through a data bus. The MC request unit 120 may store the MC reference data RDT to the pixel cache 122. The MC unit 100 may request the MC reference data RDT from a memory through a data bus and store the MC reference data RDT to the pixel cache 122. The MC unit 100 may select the MC reference data RDT stored in the pixel cache 122, by using the first selection circuit 130, and store the MC reference data RDT in the second buffer 112. The MC filter 124 may perform an MC filtering operation specified in the AV1 standard, based on the MC reference data RDT stored in the second buffer 112. The MC unit 100 may select filtering data MCD generated by the MC filter 124, by using the second selection circuit 132 and store the filtering data MCD in the third buffer 114. The MC unit 100 may transmit the filtering data MCD stored in the third buffer 114 to a reconstruction module or another module.

Figure 3A:
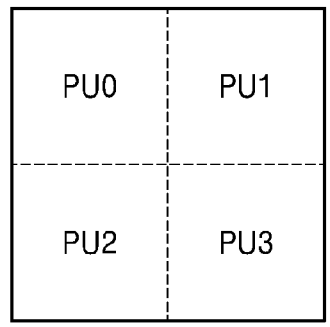
FIGS. 3A and 3B are diagrams illustrating data used during a video decoding process of FIGS. 2A and 2B, according to an example embodiment.
Figure 3B:
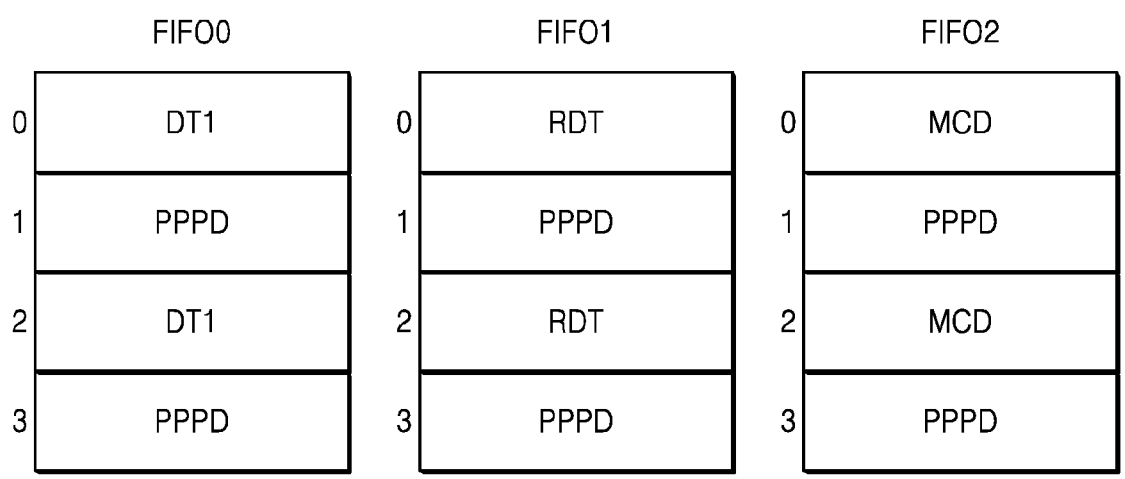

FIGS. 3A and 3B are diagrams illustrating data used during a video decoding process of FIGS. 2A and 2B, according to an example embodiment. FIFO0 to FIFO2 may correspond to the first buffer 110 to the third buffer 114 of FIG. 1.

For example, in an AV1 video codec, a frame may include one luminance signal component Y and two chrominance signal components U and V. A size of the chrominance signal components U and V may be half a size of the luminance signal component Y.

For the parallelization of encoders and decoders, the frame may be divided into tiles, each of which has a rectangular shape. When one frame is divided into several tiles, the tiles may be coded independently of each other. Each of the tiles may be divided into a superblock and a block. In the AV1 video codec, the block may be a basic coding unit, and one block may be predicted via an intra prediction operation or an inter prediction operation.

Referring to FIGS. 3A and 3B, when pixel prediction values of four prediction unit blocks are generated in one coding unit block, a first prediction unit block PU0 and a third prediction unit block PU2 may use MC data, and a second prediction unit PU1 and a fourth prediction unit block PU3 may use palette prediction pixel data. For example, the MC data DT1 generated by decoding an AV1 bit stream in an entropy decoder, the palette prediction pixel data PPPD generated by decoding the AV1 bit stream in the entropy decoder, the MC data DT1 generated by decoding the AV1 bit stream in the entropy decoder, and the palette prediction pixel data PPPD generated by decoding the AV1 bit stream in the entropy decoder may be sequentially stored in storage spaces 0, 1, 2, and 3 of a first buffer FIFO0, which respectively correspond to the first prediction unit block PU0, the second prediction unit block PU1, the third prediction unit block PU2, and the fourth prediction unit block PU3.

Reference pixel data RDT supplied from a pixel cache, the palette prediction pixel data PPPD supplied from the first buffer FIFO0, the reference pixel data RDT supplied from the pixel cache, and the palette prediction pixel data PPPD supplied from the first buffer FIFO0 may be respectively stored in storage spaces 0, 1, 2, and 3 of a second buffer FIFO1, which respectively correspond to the first prediction unit block PU0, the second prediction unit block PU1, the third prediction unit block PU2, and the fourth prediction unit block PU3.

MC pixel data MCD to which an MC filter is applied, the palette prediction pixel data PPPD supplied from the second buffer FIFO1, the MC pixel data MCD on which an MC filtering operation is ended, and the palette prediction pixel data PPPD supplied from the second buffer FIFO1 may be respectively stored in storage spaces 0, 1, 2, and 3 of a third buffer FIFO2, which respectively correspond to the first prediction unit block PU0, the second prediction unit block PU1, the third prediction unit block PU2, and the fourth prediction unit block PU3.

In the present example embodiment, storage spaces of the first buffer FIFO0, the second buffer FIFO1, and the third buffer FIFO2 may be used to store palette prediction pixel values when a prediction scheme for some prediction unit blocks, from among pixels of one coding unit block, is palette prediction, and may be used to store the MC data DT1, the reference pixel data RDT, and the MC pixel data MCD when the prediction scheme for some prediction unit blocks includes an MC operation.

Figure 4A:
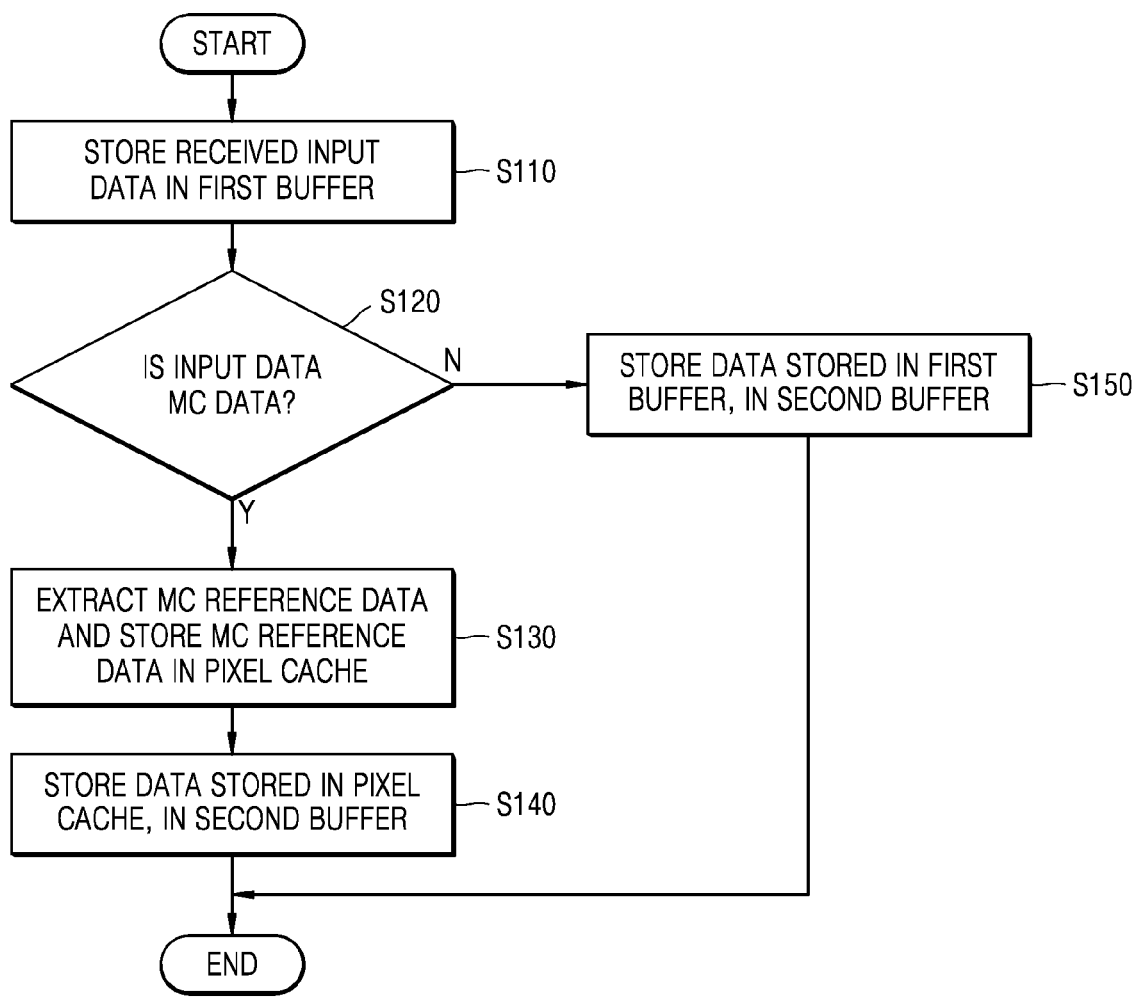
FIGS. 4A and 4B are flowcharts of a video decoding operation, according to an example embodiment.
Figure 4B:
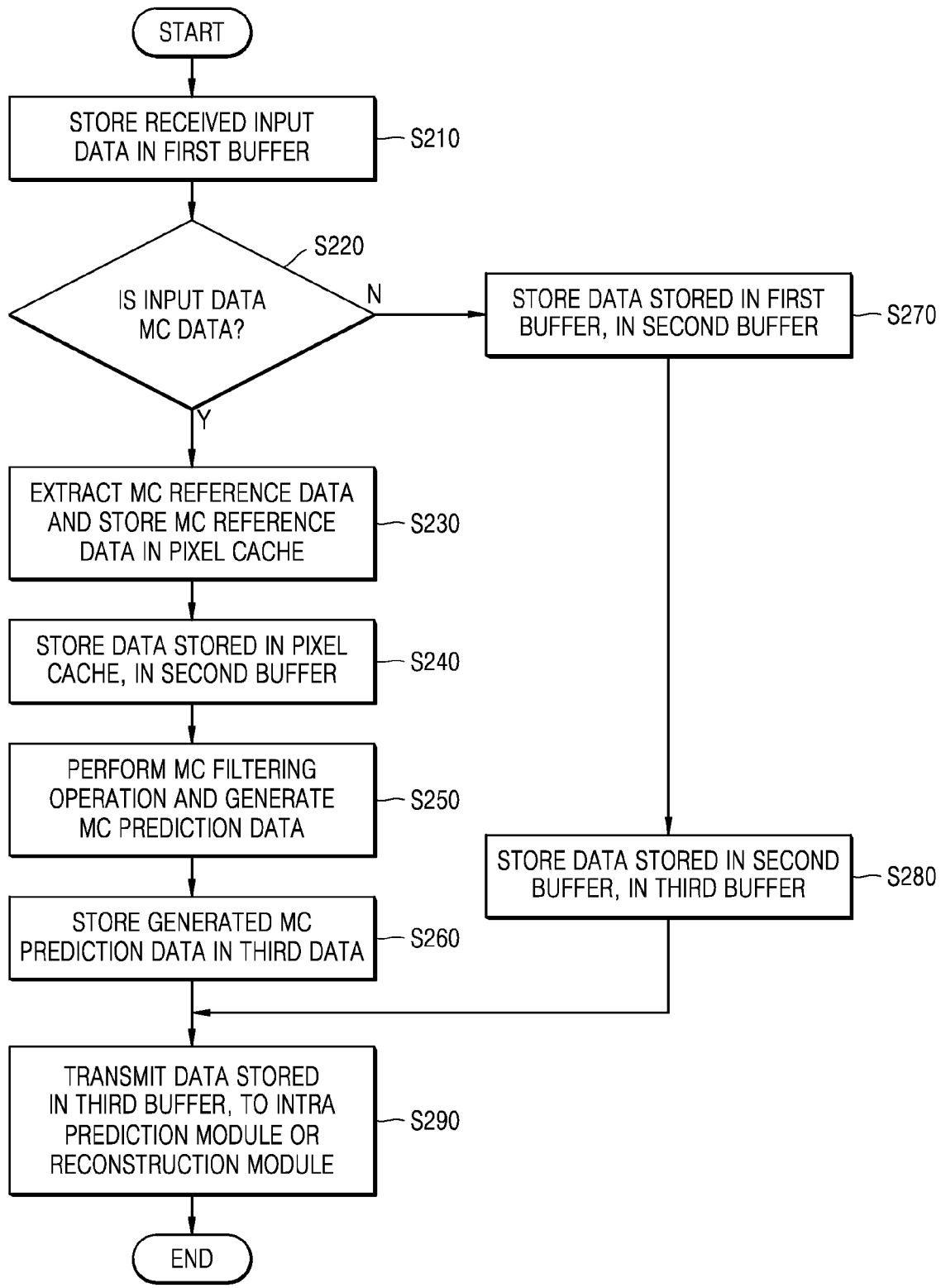

FIGS. 4A and 4B are flowcharts of a video decoding operation according to an example embodiment.

Referring to FIG. 4A, in a video decoding apparatus, input data received by an entropy decoder may be stored in a first buffer (S110). The input received by the entropy decoder may include at least one of first data including motion information and second data including intra prediction information. The intra prediction information may include palette prediction pixel data.

The video decoding apparatus may determine whether the input data is data for performing an MC operation (hereinafter, MC data) (S120). In the video decoding apparatus, a controller may control a multiplexer to select a data path according to a type of input data.

For example, when the input data is the palette prediction pixel data, the video decoding apparatus may store the palette prediction pixel data stored in the first buffer, in a second buffer (S150). The video decoding apparatus may include a first multiplexer circuit to select data to be stored in the second buffer.

When the input data is the MC data, in the video decoding apparatus, a first MC processor may extract MC reference data, based on the input data, and store the MC reference data in a pixel cache (S130).

When the input data is the MC data, the video decoding apparatus may store the MC reference data stored in the pixel cache, in the second buffer (S140).

Referring to FIG. 4B, the video decoding apparatus may store input data received by the entropy decoder, in the first buffer (S210).

The video decoding apparatus may determine whether the input data is MC data (S220).

For example, when the input data is the palette prediction pixel data, the video decoding apparatus may store the palette prediction pixel data stored in the first buffer, in the second buffer (S270). When the input data is the palette prediction pixel data, the video decoding apparatus may store the palette prediction pixel data stored in the second buffer, in a third buffer (S280). When the input data is the palette prediction pixel data, the video decoding apparatus may transmit the palette prediction pixel data stored in the third buffer to an intra prediction module or an external module (S290).

When the input data is the MC data, in the video decoding apparatus, the first MC processor may extract the MC reference data, based on the input data, and store the MC reference data in the pixel cache (S230).

When the input data is the MC data, the video decoding apparatus may store the MC reference data stored in the pixel cache, in the second buffer (S240).

When the input data is the MC data, a second MC processor may perform an MC filtering operation by receiving the MC reference data stored in the second buffer, and generate MC prediction data (S250).

The video decoding apparatus may store the generated MC prediction data in the third buffer (S260). When the input data is the MC data, the video decoding apparatus may transmit the MC prediction data stored in the third buffer to a reconstruction module or an external module (S290).

FIG. 5 is a diagram of a process of processing a luminance signal and a chrominance signal in a video decoding apparatus according to an example embodiment. The MC reference data RDT in FIG. 2b may comprises luminance signal reference data and chrominance signal reference data.

In an AV1 video codec, data may include a luminance signal and a chrominance signal.

Referring to FIG. 5, to process the luminance signal, the video decoding apparatus may include a first luma buffer 210, a first Luma MC processor 220, a luma pixel cache 230, a first luma selection circuit 240, a second luma buffer 250, a second Luma MC processor 260, a second luma selection circuit 270, and a third luma buffer 280. The first Luma MC processor 220 may request luminance signal reference data required for an MC operation, from the luma pixel cache 230, based on an AV1 video stream decoding result of an entropy decoder, which is temporarily stored in the first luma buffer 210. The first Luma MC processor 220 may request luminance signal reference data required for the MC through a data bus BUS and store the luminance signal reference data required for the MC operation to the luma pixel cache 230. The first luma selection circuit 240 may select a palette prediction pixel value or luminance signal reference data and supply a selected one of the palette prediction pixel value and the luminance signal reference data to the second luma buffer 250. The second Luma MC processor 260 including an MC filter may perform a filtering operation specified in an AV1 standard. The second luma selection circuit 270 may select the palette prediction pixel value or a pixel value obtained by completing the filtering operation, and transmit the selected pixel value to the third luma buffer 280.

To process the chrominance signal, the video decoding apparatus may include a first chroma buffer 212, a first Chroma MC processor 222, a chroma pixel cache 232, a first chroma selection circuit 242, a second chroma buffer 252, a second Chroma MC processor 262, a second chroma selection circuit 272, and a third chroma buffer 282. The first Chroma MC processor 222 may request luminance signal reference data required for MC, from the chroma pixel cache 232, based on an AV1 video stream decoding result of an entropy decoder, which is temporarily stored in the first chroma buffer 212. The first Chroma MC processor 222 may request the luminance signal reference data required for the MC operation through the data bus BUS and store the luminance signal reference data to the chroma pixel cache 232. The first chroma selection circuit 242 may select the palette prediction pixel value or the luminance signal reference data and supply a selected one of the palette prediction pixel value and the luminance signal reference data to the second chroma buffer 252. The second Chroma MC processor 262 including the MC filter may perform a filter processing operation specified in the AV1 standard. The second chroma selection circuit 272 may select the palette prediction pixel value or the pixel value obtained by completing the filtering operation, and transmit the selected pixel value to the third chroma buffer 282.

A compound difference weight WTD specified in the AV1 standard may be provided by the second Luma MC processor 260 (or MC Filter Luma) configured to process the luminance signal to the second Chroma MC processor 262 (or MC Filter Chroma) configured to process the chrominance signal. According to the AV1 standard, Chroma signal processing may depend on compound difference weight WTD obtained from Luma signal processing. Referring to FIG. 5, operations of the second Luma MC processor 260 (or MC Filter Luma) may be synchronized with operations of the second Chroma MC processor 262 (or MC Filter Chroma), and thus, an additional clock delay may not occur during the transmission of the compound difference weight WTD, and the second Luma MC processor 260 (or MC Filter Luma) and the second Chroma MC processor 262 (or MC Filter Chroma) may be designed without an additional memory device therebetween.

Figure 6:
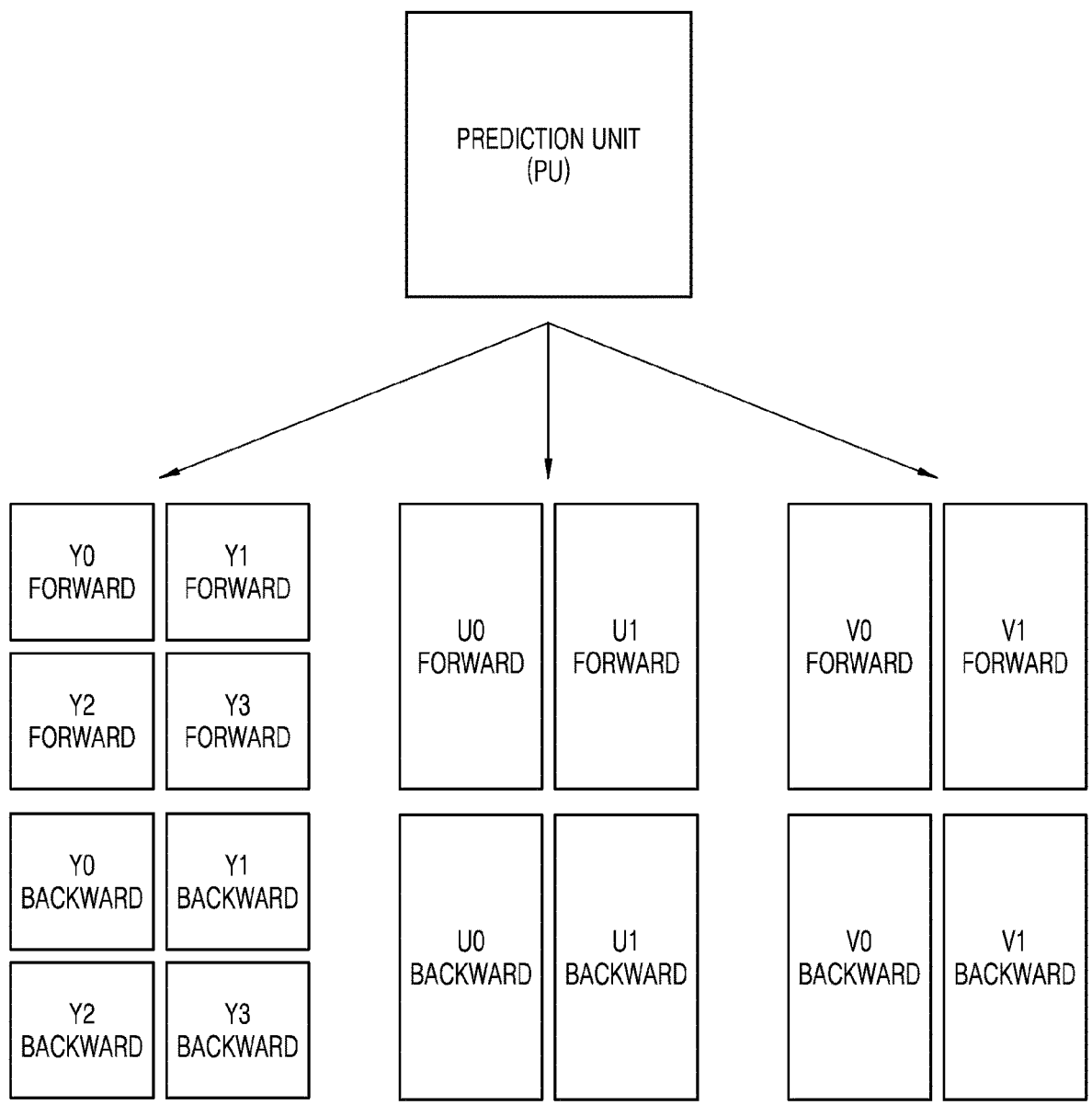
FIG. 6 is a diagram illustrating luminance signal data and chrominance signal data, according to an example embodiment.

FIG. 6 is a diagram illustrating luminance signal data and chrominance signal data, according to an example embodiment.

For example, in an AV1 video codec, a frame may include one luminance signal component Y and two chrominance signal components U and V. A size of the chrominance signal components U and V may be half the size of the luminance signal component Y.

FIG. 6 is a diagram of an example of MC reference data required to generate a prediction pixel by one prediction unit block using weight data specified in an AV1 standard. In the example of FIG. 6, a luminance signal component Y of the prediction unit block may include four pieces of forward MC reference data and four pieces of backward MC reference data, and each of chrominance signal components U and V of the prediction unit block may include two pieces of forward MC reference data and two pieces of backward MC reference data. Referring to FIG. 5, the MC reference data specified in FIG. 6 may be temporarily stored in each of the second luma buffer (250 or FIFO1 Luma) and the second chroma buffer 252 (or FIFO1 Chroma) and then used for the MC filter to perform a weight calculation specified in the AV1 standard.

FIGS. 7A and 7B are diagrams illustrating sequences in which luminance signal data and chrominance signal data are processed, according to example embodiments.

Referring to FIG. 7A, when a compound difference weight prediction operation is performed on one prediction unit block, an MC operation may be performed such that a sequence in which a luminance signal component is processed is the same as a sequence in which a U component and a Y component of a chrominance signal component are processed.

For example, when weight data of Y0 Forward data and Y0 Backward data are calculated and weight data of Y2 Forward data and Y2 Backward data are calculated, an MC operation may be performed on U0 Forward data and U0 Backward data, and an MC operation may be performed on V0 Forward data and V0 Backward data. Similarly, when weight data of Y1 Forward data and Y1 Backward data are calculated and weight data of Y3 Forward data and Y3 Backward data are calculated, an MC operation may be performed on U1 Forward data and U1 Backward data, and an MC operation may be performed on V1 Forward data and V1 Backward data.

Referring to FIG. 7B, an MC operation may be performed on a luminance signal component and a U component and a V component of a chrominance signal component in a raster scan sequence, when a compound difference weight prediction operation is performed on one prediction unit block. For example, in the case of the luminance signal component, weight data of Y0 Forward data and Y0 Backward data may be calculated, weight data of Y1 Forward data and Y1 Backward data may be calculated, weight data of Y2 Forward data and Y2 Backward data may be calculated, and weight data of Y3 Forward data and Y3 Backward data may be calculated.

In the case of the chrominance signal component, an MC operation may be performed on U0 Forward data and U0 Backward data, an MC operation may be performed on V0 Forward data and V0 Backward data, an MC operation may be performed on U1 Forward data and U1 Backward data, and an MC operation may be performed on V1 Forward data and V1 Backward data.

Figure 8A:
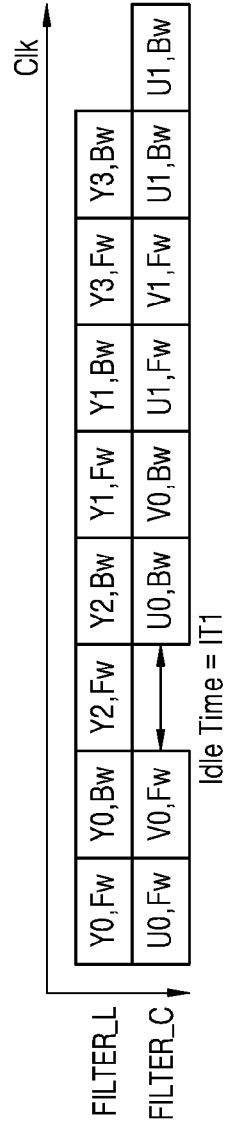
FIGS. 8A and 8B are diagrams illustrating sequences in which luminance signal data and chrominance signal data are processed, according to example embodiments.
Figure 8B:
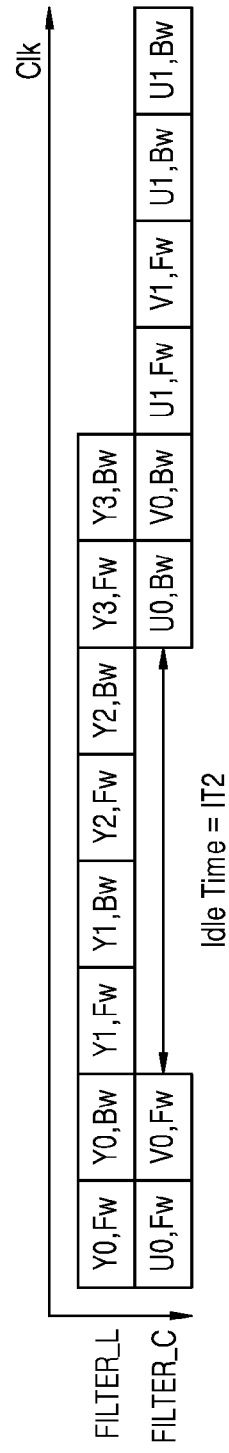

FIGS. 8A and 8B are diagrams illustrating sequences in which luminance signal data and chrominance signal data are processed, according to example embodiments.

FIG. 8A illustrates a sequence in which data included in a luminance signal component and a chrominance signal component are processed by respective processors (e.g., the second Luma MC processor 260, the second Chroma MC processor 262 shown in FIG. 5).

To perform a backward MC operation on chrominance signal components U0 and V0 in a chrominance filter FILTER_C of FIG. 8A, a difference weight generated after an MC operation is performed on luminance signal components Y0 and Y2 at the same position in a prediction unit block may be required. Accordingly, the chrominance filter FILTER_C may perform the backward MC operation on the chrominance signal components U0 and V0 after standing by until the MC operation on the luminance signal components Y0 and Y2 is all ended. A first idle time IT1 may be a time period during which Y2 forward data is processed.

In FIG. 8B, to perform a backward MC operation on chrominance signal components U0 and V0 in a chrominance filter FILTER_C of FIG. 8B, a difference weight generated after an MC operation is performed on luminance signal components Y0 and Y2 at the same position in a prediction unit block may be required. Accordingly, the chrominance filter FILTER_C may perform the backward MC operation on the chrominance signal components U0 and V0 after standing by until a luminance filter FILTER_L completes all the MC operation on the luminance signal components Y0 and Y2. A second idle time IT2 may be a time period during which Y1 forward data and Y1 backward data are processed and Y2 forward data and Y2 backward data are processed.

In a time during which a prediction operation is performed on one prediction unit block shown in FIGS. 8A and 8B, a length of an idle time may be reduced from the second idle time IT2 to the first idle time IT1 according to a sequence in which pixel data processing in the prediction unit block shown in FIGS. 7A and 7B. For example, by synchronizing pixel data processing sequence of the luminance signal component of pixels shown in FIG. 7A and the chrominance signal component shown in FIG. 7A, an idle time of a motion filter configured to process the chrominance signal component in one prediction unit block may be reduced.

Figure 9:
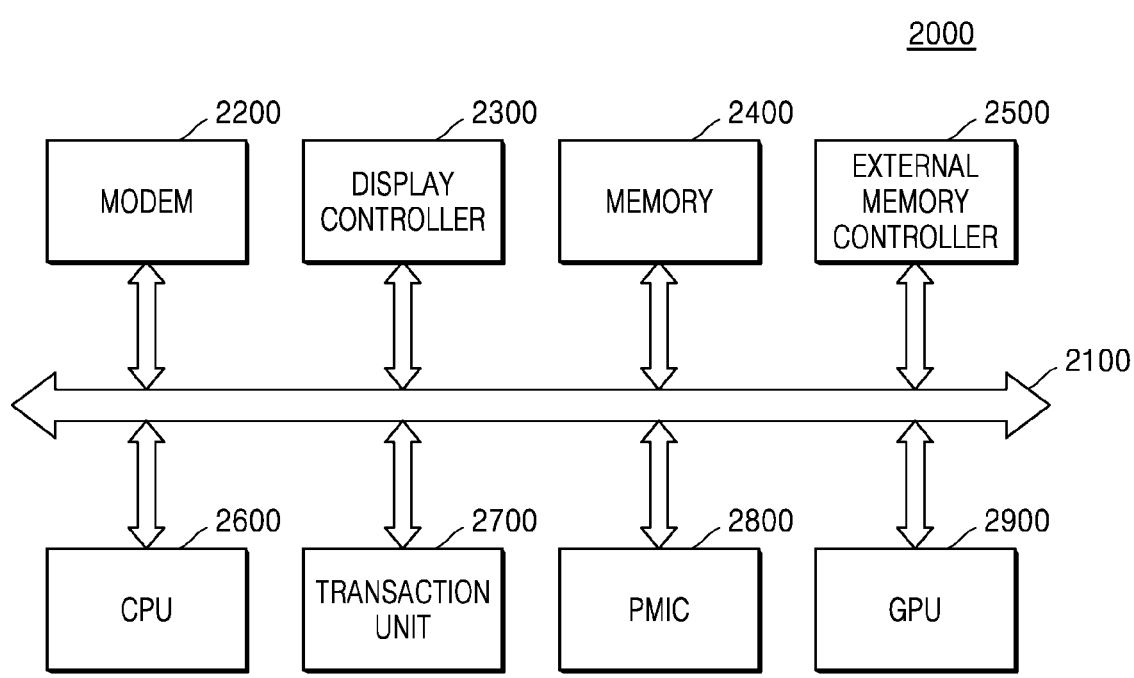
FIG. 9 is a block diagram of a system-on chip (SoC), according to an example embodiment.

FIG. 9 is a block diagram of a system-on chip (SoC) 2000 according to an example embodiment.

The SoC 2000, which is a semiconductor device, may include a video encoder or a vide decoder according to an example embodiment or perform a video encoding method. In addition, the SoC 2000 may perform a method of estimating video quality, according to an example embodiment. The SoC 2000 may be implemented as a single chip including function blocks (e.g., intellectual properties (IPs) capable of various functions. The SoC 2000 may generate encoded data (i.e., a bit stream) having improved video quality by performing a video encoding method according to an example embodiment.

Referring to FIG. 9, the SoC 2000 may include a modem 2200, a display controller 2300, a memory 2400, an external memory controller 2500, a central processing unit (CPU) 2600, a transaction unit 2700, a PMIC 2800, and a GPU 2900, and respective function blocks of the SoC 2000 may communicate with each other through a system bus 2100.

The CPU 2600 capable of controlling all operations of the SoC 2000 may control operations of other function blocks, for example, the modem 2200, the display controller 2300, the memory 2400, the external memory controller 2500, the transaction unit 2700, the PMIC 2800, and the GPU 2900. In an embodiment, the CPU 2600 may perform the video encoding method according to the example embodiment by performing instructions stored in the memory 2400. For example, the CPU 2600 may encode original data received from the external memory controller 2500, generate a bit stream, and transmit the generated bit stream to the modem 2200. In some embodiments, the CPU 2600 may perform the method of estimating the video quality, according to the example embodiment, by executing the instructions stored in the memory 2400. For example, the CPU 2600 may decode the bit stream received from the external memory controller 2500 or the modem 2200 and estimate video quality based on decoded data.

The modem 2200 may demodulate a signal received from the outside of the SoC 2000 or modulate a signal generated in the SoC 2000 and transmit the demodulated signal or the modulated signal to the outside. The modem 2200 may include the video decoding apparatus of FIG. 1 to FIG. 2B. Referring to FIG. 2B, the MC request unit 120 (i.e., a first motion compensation processor) of the video decoding apparatus may be a device configured to request the MC reference data, from a memory 2400 through a data bus, required for the MC operation of the AV1 standard and store the MC reference data to the pixel cache 122. The external memory controller 2500 may control an operation of transmitting and receiving data to and from an external memory device connected to the SoC 2000. For example, a program and/or data stored in the external memory device may be provided to the CPU 2600 or the GPU 2900 via the control of the external memory controller 2500.

The GPU 2900 may execute program instructions related to a graphics processing operation. The GPU 2900 may receive graphics data through the external memory controller 2500 or process the graphics data and transmit the processed graphics data through the external memory controller 2500 to the outside of the SoC 2000. In an embodiment, the GPU 2900 may perform a video encoding method or a video decoding method according to an example embodiment. For example, the GPU 2900 may encode the original data received from the external memory controller 2500, generate a bit stream, and transmit the bit stream to the modem 2200.

The transaction unit 2700 may monitor data transaction of each of the function blocks, and the PMIC 2800 may control power supplied to each function block via the control of the transaction unit 2700. The display controller 2300 may control a display (or a display device) outside the SoC 2000 and transmit data generated in the SoC 2000 to the display.

The memory 2400 may include a non-volatile memory or a volatile memory. Examples of the non-volatile memory may include electrically erasable programmable read-only memory (EEPROM), flash memory, phase-change random access memory (PRAM), resistive RAM (RRAM), nano floating Gate Memory (NFGM), polymer RAM (PoRAM), magnetic RAM (MRAM), and ferroelectric RAM (FRAM). Examples of the volatile memory may include dynamic RAM (DRAM), static RAM (SRAM), mobile DRAM, double-data-rate (DDR) synchronous DRAM (SDRAM), low-power DDR (LPDDR) SDRAM, graphics DDR (GDDR) SDRAM, and Rambus DRAM (RDRAM). The memory 2400 may store the original data or the bit stream, which is described above.

While the inventive concept has been particularly shown and described with reference to embodiments thereof, it will be understood that various changes in form and details may be made therein without departing from the spirit and scope of the following claims.

What is claimed is:

1. A video decoding apparatus comprising:
   an entropy decoder configured to receive a bit stream and generate input data,
   wherein the input data comprises one of first data including motion information and second data including intra prediction information;
   a first buffer connected to the entropy decoder and configured to store the input data received from the entropy decoder;
   a first motion compensation processor connected to the first buffer and configured to extract motion compensation reference data based on the input data;
   a pixel cache connected to the first motion compensation processor and configured to store the motion compensation reference data received from a memory through a data bus;
   a second buffer;
   a first multiplexer having:
      a first input directly connected to the first buffer to form a first data processing path having no intervening functional component between the first input and the first buffer,
      a second input connected to the pixel cache to form a second data processing path, and
      an output connected to the second buffer; and
   a controller configured to control the first multiplexer such that:
      when the input data is the first data, the first multiplexer selects the second data processing path and the second buffer stores the motion compensation reference data stored in the pixel cache; and
      when the input data is the second data, the first multiplexer selects the first data processing path, and the second buffer stores the second data stored in the first buffer.

2. The video decoding apparatus of claim 1, further comprising:
   a second motion compensation processor connected to the second buffer and configured to perform a motion compensation filtering operation by receiving the motion compensation reference data, and generate motion compensation prediction data;
   a third buffer; and
   a second multiplexer having inputs connected to the second buffer and the second motion compensation processor and an output connected to the third buffer,
   wherein the controller is configured to control the second multiplexer such that the third buffer stores the motion compensation prediction data when the input data is the first data, and the third buffer stores the second data stored in the second buffer when the input data is the second data.

3. The video decoding apparatus of claim 1,
   wherein the second data comprises palette prediction pixel data.

4. The video decoding apparatus of claim 1,
   wherein the first data comprises at least one of luminance signal data and chrominance signal data.

5. The video decoding apparatus of claim 2,
   wherein the motion compensation reference data comprises luminance signal reference data and chrominance signal reference data, and
   wherein the second motion compensation processor processes the chrominance signal reference data based on a result of processing of the luminance signal reference data.

6. The video decoding apparatus of claim 1,
   wherein the first buffer and the second buffer operate according to a first-in-first-out (FIFO) rule.

7. The video decoding apparatus of claim 2, further comprising:
   an intra prediction and reconstruction module connected to the third buffer,
   wherein the controller is configured to control the third buffer and the intra prediction and reconstruction module so that data stored in the third buffer is transmitted to the intra prediction and reconstruction module.

8. A video decoding method comprising:
   receiving, by an entropy decoder, input data comprising one of first data comprising motion information and second data comprising intra prediction information and storing the received input data in a first buffer;
   determining whether the input data includes which one of the first data and the second data;
   in response to the input data being the first data, extracting motion compensation reference data based on the input data, storing the motion compensation reference data in a pixel cache, and then storing the motion compensation reference data stored in the pixel cache in a second buffer; and
   in response to the input data being the second data, storing the second data stored in the first buffer in the second buffer.

9. The video decoding method of claim 8, further comprising:
   selecting one of the motion compensation reference data and the second data to be stored in the second buffer using a first multiplexer circuit.

10. The video decoding method of claim 8, further comprising:
    performing a motion compensation filtering operation by receiving the motion compensation reference data stored in the second buffer;
    generating, in response to the input data being the first data, motion compensation prediction data;
    storing the generated motion compensation prediction data in a third buffer; and
    storing, in response to the input data being the second data, the second data stored in the second buffer in the third buffer.

11. The video decoding method of claim 10, further comprising:
   selecting one of the motion compensation prediction data and the second data to be stored in the third buffer using a second multiplexer circuit.

12. The video decoding method of claim 8, wherein the second data comprises palette prediction pixel data.

13. The video decoding method of claim 8, wherein the first data comprises at least one of luminance signal data and chrominance signal data.

14. The video decoding method of claim 10, wherein the motion compensation reference data comprises luminance signal reference data and chrominance signal reference data, and
   wherein the chrominance signal reference data is generated based on a result of processing of the luminance signal reference data.

15. The video decoding method of claim 10, wherein the first buffer and the second buffer operate according to a first-in-first-out (FIFO) rule.

16. The video decoding method of claim 10, further comprising:
   transmitting data stored in the third buffer to an intra prediction and reconstruction module.

* * * * *